J. E. DONOVAN.

SEWING MACHINE TABLE.

No. 9,937. Reissued Nov. 22, 1881.

Witnesses
J. A. Rutherford
Jno. E. Jones

Inventor
John E. Donovan,
by Wood & Boyd
his Attorneys &c.

N. PETERS, Photo-Lithographer, Washington, D. C.

UNITED STATES PATENT OFFICE.

JOHN E. DONOVAN, OF CINCINNATI, OHIO.

SEWING-MACHINE TABLE.

SPECIFICATION forming part of Reissued Letters Patent No. 9,937, dated November 22, 1881.

Original No. 225,809, dated March 23, 1880. Application for reissue filed October 21, 1881.

*To all whom it may concern:*

Be it known that I, JOHN E. DONOVAN, of Cincinnati, in the county of Hamilton and State of Ohio, have invented certain new and useful Improvements in Sewing-Machine Tables; and I do hereby declare that the following is a full, clear, and exact description thereof, reference being had to the accompanying drawings, making a part of this specification, in which—

Figure 1:
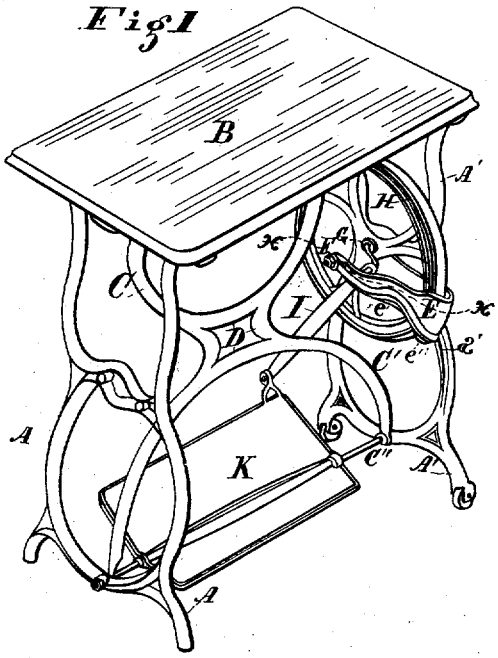
Figure 2:
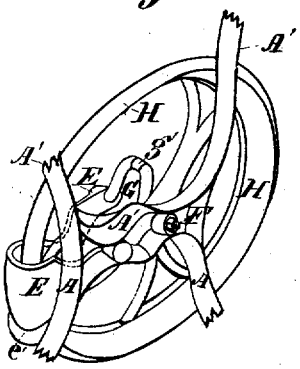
Figure 3:
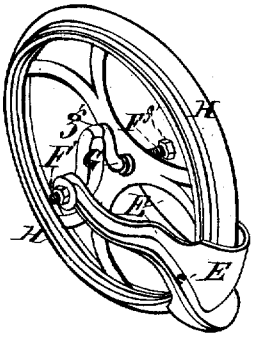
Figure 4:
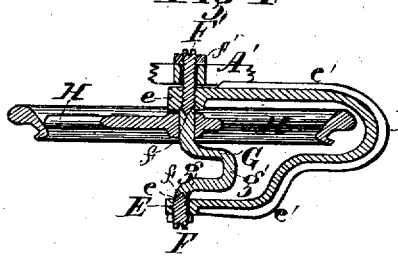

Figure 1 is a perspective view of a table containing my improvement. Fig. 2 is a like view of one end of the same, showing the means employed for connecting therewith the balance-wheel yoke. Fig. 3 is a perspective view of said yoke and the balance-wheel separated from the table, and Fig. 4 is a central section of said parts upon line *x x* of Fig. 1.

Letters of like name and kind refer to like parts in each of the figures.

In the construction of sewing-machine tables it is the almost invariable custom to journal the balance or driving wheel upon a stud which is secured to and projects inward from some part of the frame, and to journal the upper end of the pitman upon a crank-pin which projects inward from one of the arms of said wheel at a suitable distance from its axial bearing. This method has been open to serious objections, among which are the great accuracy required in the fitting of the wheel upon its bearing in order to prevent lateral irregularity in the movement of its rim, the unequal wear upon the stud and upon the axial opening in said wheel in consequence of the thrust of the pitman, and the large size of said bearing-stud required to enable it to withstand in any degree such unequal side pressure, resulting in the creation of a large amount of friction-surface, which materially increased the labor of running the machine.

My invention obviates these difficulties by providing a yoke with two arms, one on either side of the wheel, and journaling the pitman-shaft within the arms upon the coincident axial bearings affixed to the arms, so that the yoke and pitman or crank shaft will be supported within the yoke and independent of the frame of the machine.

My invention further consists in providing conical axial bolts, tapping through the arms of the yoke in a coincident plane, in combination with a pitman crank-shaft having conical cavities at each end to form bearings for the conical center bolts.

My invention further consists in the means for connecting said yoke and its contained crank-shaft to the frame of the machine, so that the yoke and its sustained crank-shaft can be attached to and removed from the frame of the machine without disturbing the crank-shaft and its journals.

It consists, finally, in the combined crank-shaft bearing and dress-protector, substantially as and for the purpose hereinafter set forth.

In the drawings, A A′ represent the end frames or legs, secured at their upper ends to and supporting table B.

C C′ represent an X-shape center brace, connected to the top and bottom of side pieces, A A′, so as to strengthen and brace the parts of the table.

E represents a yoke, which is bent so as to form arms *e′ e′*. One of the arms *e′ e′* is bent or offset, so as to provide sufficient space for the pitman-shaft and fly-wheel to revolve between the arms of the yoke.

*e e* represent screw-threaded holes tapped through the arms *e′ e′*. These openings coincide with each other, the centers of which are in the axial plane of the pitman shaft.

F F′ represent pointed screws, which tap in the screw-threaded openings *e e*.

*f f* represent the conical points which form the axial shaft bearing.

G represents a pitman-shaft, provided at each end with a conical cavity, *g*, which turn on the centers *f f*. The pitman-shaft G is attached within the arms of the yoke by means of conical screws *f f*, and adjusted centrally with the yoke. The jam-nut *f″* is then turned on the screw F to hold it to its adjustment. The yoke E and its contained pitman-shaft and wheel H are then secured to the frame A by putting the screw F through the leg A, and the parts are secured to the frame by means of the lock-nut *f′*. This construction allows the yoke and its sustained parts to be removed from or attached to the machine without displacing the relative adjustment of the shaft-bearings, which are fixed to the arms of the yoke and remain coincident to each other in the plane of the axis to the pitman-shaft.

Near the outer end of the shaft G is secured a balance and band wheel, H, of the usual form. Between said wheel and the inner end of said shaft is provided a crank, $g'$, upon which is journaled one end of a pitman, I, the opposite end of which is pivoted upon one end of an ordinary treadle, K, that is journaled upon the brace-rod C″. As arranged, the balance and band wheel is supported upon bearings which are sufficiently separated to give great steadiness, and to prevent the thrust of the pitman from causing undue pressure and wear at any point, while from the location of said bearings I have reduced the bearing-surfaces until but little friction is caused, and but little power is necessary for operating the machine.

In order that the yoke E may operate as a dress-protector its loop end is widened in the manner shown in Fig. 1.

To assist in holding the yoke steady the rib on said yoke may rest in groove $a'$ in the leg A′, or other similar methods may be employed.

Having thus fully set forth the nature and merits of my invention, what I claim as new is—

1. As an improvement in sewing-machine tables, a yoke provided with coincident shaft-journals in its opposite arms for the journaling of the crank-shaft and its balance-wheel, and adapted to be attached to or removed from the frame of the table without displacement of said shaft from its bearings within said yoke, substantially as and for the purpose specified.

2. In combination with yoke E, having adjustable conical shaft-bearings coincident to the axial planes of the shaft, the crank-shaft G and balance-wheel H, adapted to be attached to and removed from the frame of the machine, substantially as herein set forth.

3. As a means for combining the yoke E with the leg A′, the outer journal-screw, F′, contained within and projecting from said yoke through said leg, and the nut $f'$, placed upon the outer end of said screw, said parts being combined in the manner substantially as shown.

4. A combined crank-shaft bearing and dress-protector consisting of yoke E, having coincident axial bearings for the pitman-shaft in the arms of the yoke and doubled around the rim of the suspended balance-wheel H, substantially as herein set forth.

In testimony whereof I have hereunto set my hand in the presence of two subscribing witnesses.

JOHN E. DONOVAN.

Witnesses:
JOHN E. JONES,
JOHN E. WILES.